(12) United States Patent
Timoshenko et al.

(10) Patent No.: US 11,670,069 B2
(45) Date of Patent: Jun. 6, 2023

(54) SYSTEM AND METHOD FOR FACE SPOOFING ATTACK DETECTION

(71) Applicant: ID R&D, Inc., New York, NY (US)

(72) Inventors: Denis Timoshenko, New York, NY (US); Konstantin Simonchik, New York, NY (US); Alexey Khitrov, New York, NY (US)

(73) Assignee: ID R&D, Inc., New York, NY (US)

(*) Notice: Subject to any disclaimer, the term of this patent is extended or adjusted under 35 U.S.C. 154(b) by 0 days.

(21) Appl. No.: 16/783,465

(22) Filed: Feb. 6, 2020

(65) Prior Publication Data

US 2021/0248401 A1 Aug. 12, 2021

(51) Int. Cl.
*G06K 9/00* (2022.01)
*G06V 40/40* (2022.01)
*G06V 40/16* (2022.01)

(52) U.S. Cl.
CPC ............ *G06V 40/40* (2022.01); *G06V 40/172* (2022.01)

(58) Field of Classification Search
CPC ...... G06F 21/32; G06F 21/6218; G06F 21/83; G06F 2221/2133; G06K 9/00255; G06K 9/00281; G06K 9/00288; G06K 9/00906; G06K 9/00221; G06K 9/00228; G06K 9/00261; G06K 9/00624; G06K 9/00791; G06K 9/00899; G06K 9/4652;
(Continued)

(56) References Cited

U.S. PATENT DOCUMENTS

2014/0016837 A1* 1/2014 Nechyba ............ G06K 9/00221
382/118
2016/0117544 A1* 4/2016 Hoyos ................ G06K 9/00604
348/78
(Continued)

FOREIGN PATENT DOCUMENTS

CA      3043230 A1   12/2018
CN   109271941 A    1/2019
(Continued)

OTHER PUBLICATIONS

Zhu, Xun, et al. "Detection of spoofing medium contours for face anti-spoofing." IEEE Transactions on Circuits and Systems for Video Technology 31.5 (2019): 2039-2045. (Year: 2019).*

*Primary Examiner* — Michael J Vanchy, Jr.
(74) *Attorney, Agent, or Firm* — Millen, White, Zelano & Branigan, P.C.; William Nixon; Wan-Ching Montfort (57) ABSTRACT

The present application relates to the field of computer software technologies, and in particular, to a face spoofing attack detection method and system. The suggested method comprises capturing an image; determining a context of the captured image; highlighting a part of the captured image to generate an image with the highlighted part, wherein the highlighted part is a potential spoofing region determined based on the context of the captured image; combining the captured image with the image with the highlighted part to generate a summarized image; performing face spoofing attack detection in the summarized image, wherein only the highlighted part has priority in the face spoofing attack detection, generating a general spoofing score as a result of the face spoofing attack detection; comparing the general spoofing score result with a threshold for face liveness detection.

10 Claims, 5 Drawing Sheets

(58) Field of Classification Search
CPC .... G06K 9/6274; G06K 9/66; H04L 63/0861; H04L 63/1483; H04L 9/0844; H04L 9/085; H04L 9/3228; H04L 9/3231; H04L 9/3234; H04L 9/3247; G06N 20/00; G06N 3/0454; G06N 3/084; G07C 9/37; G07C 9/38; H04W 12/06; H04W 12/65
See application file for complete search history.

(56) References Cited

U.S. PATENT DOCUMENTS

| | | | |
|---|---|---|---|
| 2017/0344858 A1* | 11/2017 | Ohira | G06K 9/00771 |
| 2018/0025217 A1 | 1/2018 | Chandraker et al. | |
| 2018/0060680 A1 | 3/2018 | Alon | |
| 2019/0042718 A1 | 2/2019 | Prakash et al. | |
| 2020/0380279 A1* | 12/2020 | Yang | G06V 40/40 |
| 2021/0082136 A1* | 3/2021 | Nikitidis | G06V 40/172 |

FOREIGN PATENT DOCUMENTS

| | | |
|---|---|---|
| CN | 109325328 A | 2/2019 |
| EP | 3467709 A1 | 4/2019 |

\* cited by examiner

SYSTEM AND METHOD FOR FACE SPOOFING ATTACK DETECTION

TECHNICAL FIELD

The present application relates to the field of computer software technologies, and in particular, to a face spoofing attack detection method and system.

BACKGROUND OF THE INVENTION

Fraudsters constantly attack facial biometric security systems to find weaknesses. "Spoofing" refers to an attack on a facial biometric system that attempts to use a digital or analog representation of a human being instead of a "live" person for the purpose of fraud of authentication procedures.

Currently, there exist several methods for so called liveness detection, i.e. for detection if a user who wishes to authenticate himself or herself is a real user, such as: when a user needs to perform any movement on a camera; when a texture of an entire image is estimated; when a distance to various points located on a face of a user is estimated, etc. Also, a common method for liveness detection is to focus a system on any one specific area, for example, estimating only glare of the pupils of a user.

For example, one known method discloses liveness detection for antispoof face recognition including a liveness detection task and a face recognition task. These tasks are solved by a deep learning model that is applied to the input image to recognize an identity of a subject in the input image and a liveness of the subject, and the liveness detection task is configured to evaluate a plurality of different distractor modalities corresponding to different physical spoofing materials to prevent face spoofing for the face recognition task.

Another known face liveness detection method includes training a first deep learning model based on general facial images; training a second deep learning model based on extracted facial images cropped from the general facial images; and performing face liveness detection based on the trained first deep learning model and the trained second deep learning model. In order to detect liveness, it is necessary to analyze in this method both general facial images containing a background and extracted facial images cropped from general facial images containing only a face.

SUMMARY OF THE INVENTION

The present invention provides a face liveness detection method and a system for face spoofing attack detection that improve dual image processing using one model for liveness detection and more accurately determining regions for analysis. Thus, the proposed method provides high speed face spoofing attack detection while ensuring high accuracy face spoofing attack detection.

In a first aspect of the present invention, a method for face spoofing attack detection is provided. The method comprises capturing an image containing a face of a user; highlighting at least one part of the captured image, which is a potential spoofing region; selecting a method for user liveness detection for the highlighted at least one part of the captured image, which is a potential spoofing region; performing user liveness detection using the selected method and based on the highlighted at least one part of the captured image to obtain a general spoofing score; comparing the general spoofing score result with a threshold for face liveness detection.

In a second aspect of the present invention, a system for face spoofing attack detection is provided. The system comprises a camera configured to capture an image containing a face of a user, a spoofing mask module configured to highlight at least one part of the captured image, potentially indicating a fake user liveness; a liveness module configured to select a method for user liveness detection for the highlighted at least one part of the captured image and to detect a user liveness using the selected method and based on the highlighted at least one part of the captured image to obtain a general spoofing score; a comparative module configured to compare the general spoofing score result with a threshold for face liveness detection.

The method and the system according to the present invention requires less time and performance requirements for liveness detection then conventional methods and systems, while providing reliable and accurate liveness detection.

In the present invention, liveness detection is carried out in combination with face recognition, which does not allow use of the method for liveness detection as an independent procedure.

BRIEF DESCRIPTION OF THE DRAWINGS

To describe the suggested technical solutions in embodiments of the present application or in the existing technology more clearly, the following briefly introduces accompanying drawings required for describing the embodiments or the existing technology. The drawings illustrate generally, by way of example, but not by way of limitation, various embodiments discussed in the present disclosure.

DETAILED DESCRIPTION OF THE PREFERRED EMBODIMENTS

The present invention will now be described more fully with reference to the accompanying drawings, in which example embodiments of the present invention are illustrated. The subject matter of this disclosure may, however, be embodied in many different forms and should not be construed as being limited to the embodiments set forth herein.

The following example embodiments of the present invention are provided for face spoofing attack detection at time of user registration on any device. However, the present invention is not limited to said embodiments and can be implemented both as an independent system and in combination with any other systems so as to realize specific advantages and technical effects.

The term highlighting in the present disclosure refers to selecting one or more parts of a captured image using any known techniques and algorithms applicable for the present invention.

In a preferred embodiment, selecting (highlighting) at least one part of the captured image, which is a potential spoofing region, and performing user liveness detection are made using a deep learning model. All deep learning models in the present invention are based on a neural network.

Figure 1A:
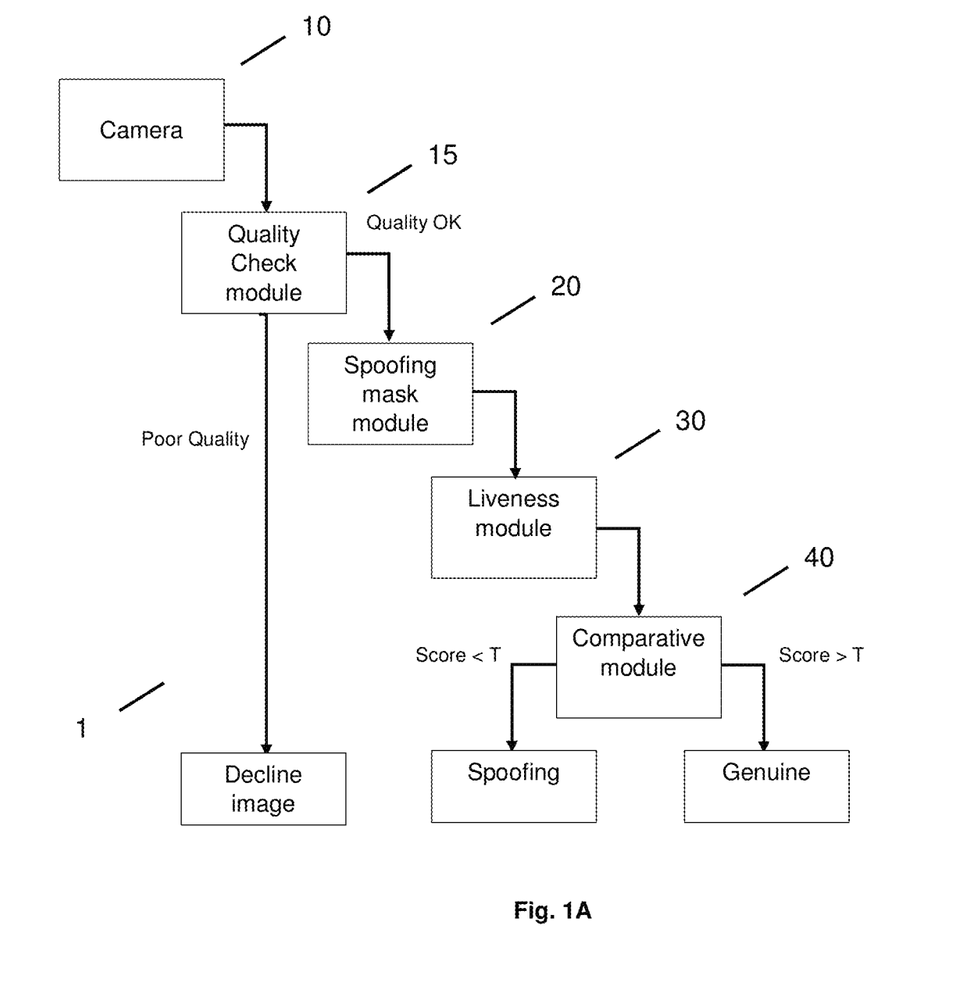
FIG. 1A shows a system of a face liveness detection method according to an example embodiment of the present invention.

In a preferred embodiment, a system 1 for face spoofing attack detection includes a Camera 10, a Quality Check Module 15, a Spoofing Mask Module 20, a Liveness Module 30 and a Comparative Module 40, which is illustrated in FIG. 1A. FIG. 1A shows a sequence of modules in accordance with steps of the method for face spoofing attack detection according to the present invention in the form of a pipeline.

The Camera 10 is provided to capture an image containing a face of a user. The Quality Check Module 15 is a module that evaluates quality of a captured image. The Spoofing Mask Module 20 is a module that is designed to select at least one part of the captured image, which is a potential spoofing region, in particular, which is an artifact of spoofing attacks. The Liveness Module 30 is a module that is designed to perform user liveness detection and to obtain a general spoofing score. The Comparative Module 40 is provided to compare the general spoofing score result with a threshold for face liveness detection.

Figure 1B:
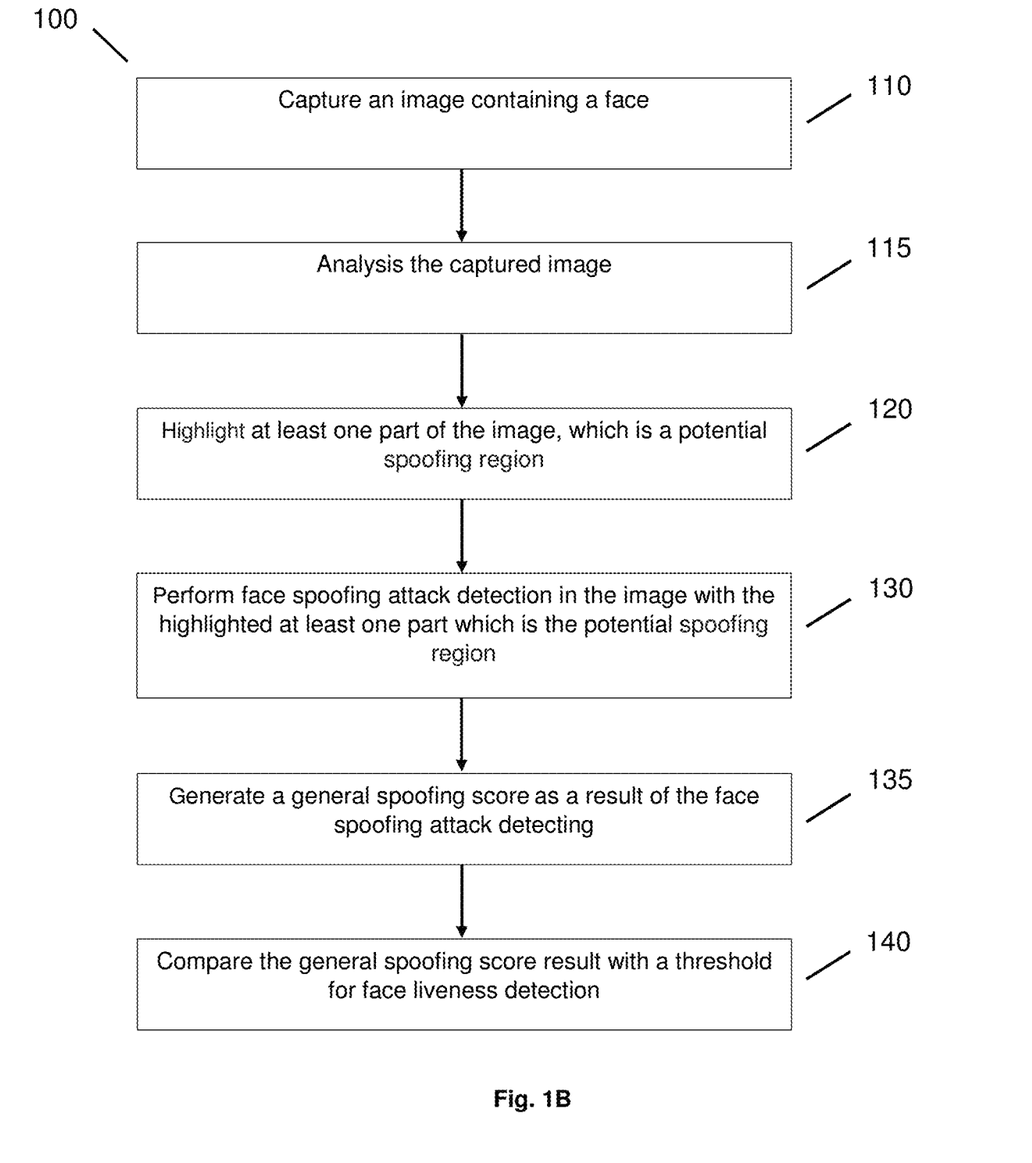
FIG. 1B shows a flow diagram of a face liveness detection method according to an example embodiment of the present invention.
Figure 2A:
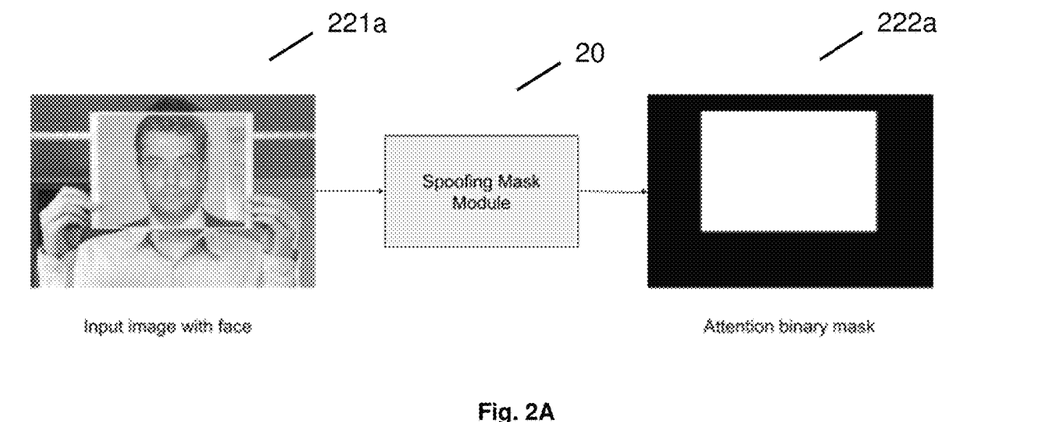
FIG. 2A illustrates mask propagation for an image with a spoofed face using a printed paper according to an example embodiment of the present invention.
Figure 2B:
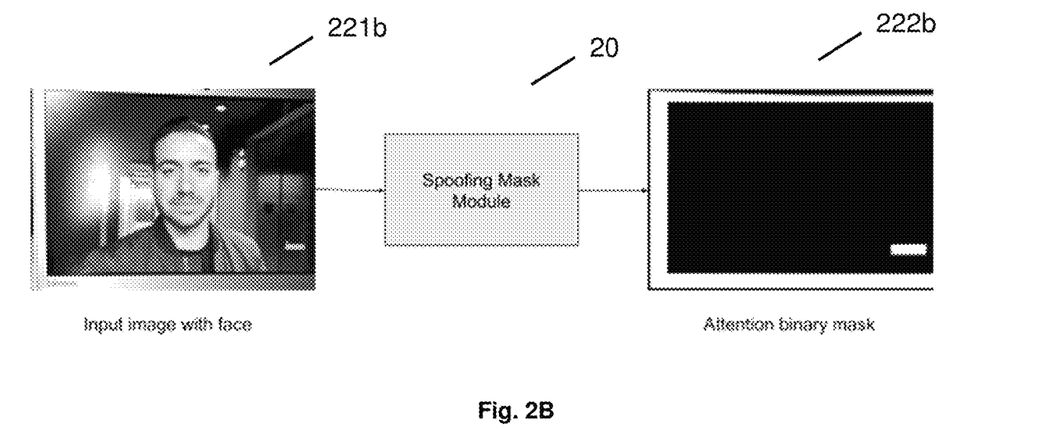
FIG. 2B illustrates mask propagation for an image with a spoofed face using a display according to an example embodiment of the present invention.
Figure 2C:
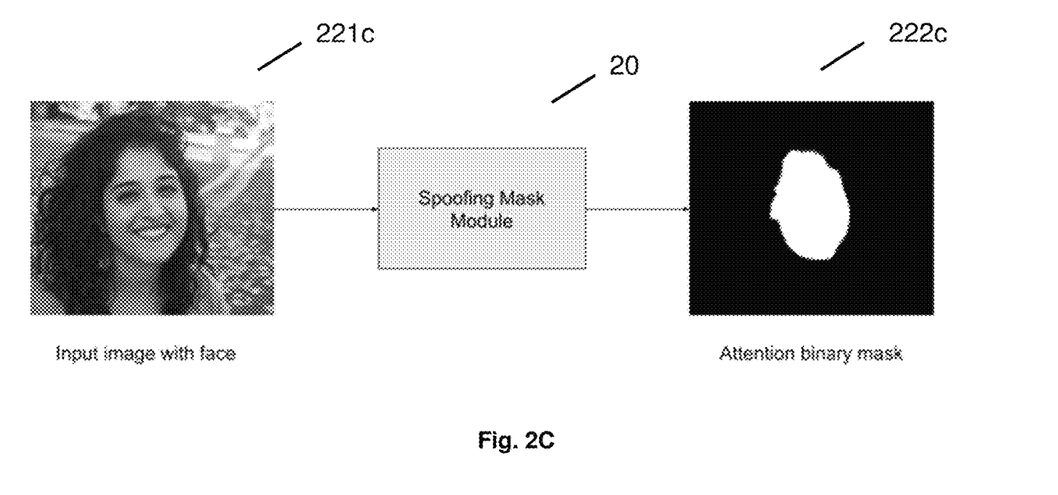
FIG. 2C illustrates mask propagation for an image with a genuine face according to an example embodiment of the present invention.
Figure 2D:
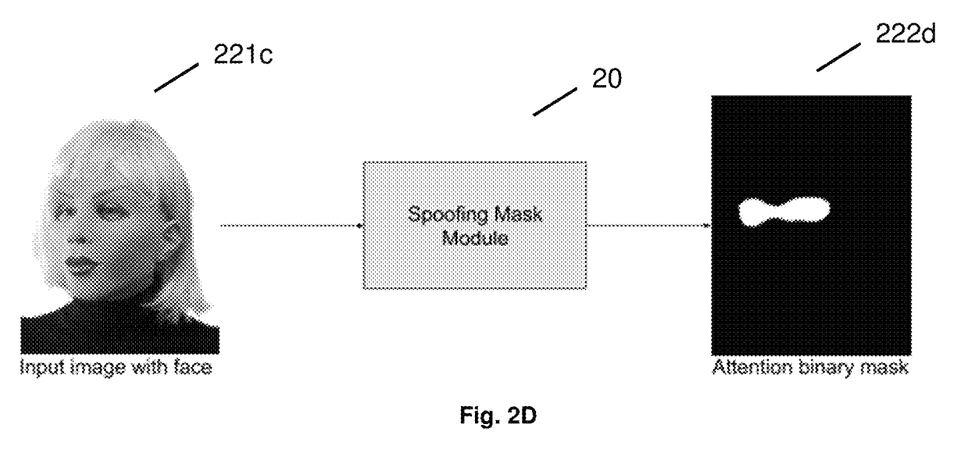
FIG. 2D illustrates mask propagation for an image with a spoofed face using a mask according to an example embodiment of the present invention.

FIG. 1B shows a flow diagram in accordance with steps of the method 100 for face spoofing attack detection. A user presents his or her face before a camera, which can be a built-in or peripheral camera, for example, of a mobile communication device or a computing device, a computer, or a stationary electronic device, etc. The proposed method comprises capturing 110 an image containing a face. Further, analyzing 115 the captured image is performed by the Quality Check Module. The captured image is analyzed by a DLIB facial shape predictor on every start of the pipeline: if the image does not contain a face, then the pipeline stops; if a distance between corners of eye fissures is lower than a threshold value, then the pipeline stops; if an out-of-plane head rotation (the angle is estimated from landmarks position) is bigger than a threshold value, then the pipeline stops.

Additionally, an image quality is determined in the Quality Check Module, i.e. it determines whether the image is suitable for further analysis and, if the image quality is poor, the pipeline also stops. In case the pipeline stops, a new image is requested and the method starts from the beginning.

If the image meets all the criteria evaluated in the Quality Check Module, it enters the Spoofing Mask Module. This module evaluates face areas and other areas of the image for presence of artifacts of spoofing attacks. Highlighting 120 at least one part of the image, which is a potential spoofing region, is performed by the Spoofing Mask Module. The Spoofing Mask Module can select (highlight) one or more suspicious regions, i.e. regions that are artifacts of spoofing attacks. The selection of one or more regions depends on what is shown in the image. For example, a face can be framed if someone is holding a photo in hands, in which case the face region and the frame region will be selected as suspicious regions. In another image, for example, a face will have additional contours around eyes, if a mask is on the face, then the eye region will be considered as a suspicious region. Thus, the Spoofing Mask Module analyzes not only the region of the face, but various regions of the image that are interesting or important in terms of attack features.

The image with the highlighted at least one part, which is the potential spoofing region, enters the Liveness Module (it is important to note that there can be more than one selected region). Performing 130 face spoofing attack detection in the image with the highlighted at least one part which is the potential spoofing region is made by the Liveness Module. The Liveness Module selects a principle, or a method, of user liveness detection for a specific region of the image. In particular, if the selected region is an eye region, then the principle of liveness detection will be different from that one in case the selected region is a region containing a frame from a photo. In case of several selected regions, selection of a principle of liveness detection can also be selected for each region separately.

Generating 135 a general spoofing score as a result of the face spoofing attack detection is performed after the user liveness detection by the Liveness Module. The Comparative Module performs comparing 140 the general spoofing score result with a threshold for face liveness detection. If the general spoofing score does not exceed the threshold, then the face in the image is genuine, i.e. the face of the user depicted in the image is alive and undoctored. If the general spoofing score exceeds the threshold, then the image contains an untruthful face. In case of several selected regions, the Module makes liveness detections of each region and gives a spoofing score for each region, which is also compared by a threshold value. The decision whether the face in the image is genuine, or not, is also made on the basis of the received spoofing scores.

Thus, the present invention distinguishes an image of a real face from that of a fake image using liveness detection. A fake image can be implemented, for example, by a high-quality three-dimensional (3D) mask, a paper print-out, an electronic display, or other "distractor" modality. The proposed method and system for face spoofing attack detection allows accurately selecting (highlighting) a region of an image, which is a fake, and accurately performing liveness detection.

The proposed method and system support face recognition to determine authenticity of an input and can operate with hardware of different types. Also, the proposed method can be used separately from identification and authentication systems of a user's identity. For example, the present invention may be used during user registration in an application. In case when the application during user registration does not yet have data about the user being registered the application needs to collect true user data, for example, the user's face image. In this case, the proposed method will allow the application to determine whether a real (true) user is being registered and not hiding under a mask of another user. This feature will allow the application to immediately collect truthful data about the registered user and prevent fraud. Such applications may include banking systems as well as any transaction systems.

Each module will be described now in more detail.

The Quality Check Module defines a quality, i.e. suitability of an image for further analysis. Image quality is measured by two separate modules. The first one is based on facial features only, while the second one analyses the entire image.

The first module is a Face Detector, which uses a DLIB frontal face detector. This face detector is made using the well known Histogram of Oriented Gradients (HOG) feature combined with a linear classifier, an image pyramid and sliding window detection scheme. The result of detection process is a list of face rectangles (top-left and bottom-right points). Given face rectangles is used by anti-spoofing algorithms generally. These results are also analyzed by a DLIB facial shape predictor on every start of pipeline:

If an image does not contain a face, then the pipeline stops.

If a distance between corners of eye fissures is lower than threshold value, then the pipeline stops.

If an out-of-plane head rotation (the angle is estimated from landmarks position) is bigger than a threshold value, then the pipeline stops.

The second module is a BlurColorNnet. The BlurColorNnet is a proper module of quality function, which detects inappropriate photo conditions and rejects low quality images. The module detects three main inappropriate conditions:

Blurred images;
Unexposed/overexposed images;
High/low contrast images.

For this task a special subset from real (live) data (real-without-blur) is gathered. These images are treated as samples for "positive" class, while "negative" class samples can be generated by augmentations.

To generate blurred images motion, Gaussian and average blur are used. To generate unexposed or overexposed images, the images by low and high constant values are multiplied. For contrast augmentation, gamma contrast with a low or high gamma parameter is used.

The BlurColorNnet architecture is based on MobileNetV2 network. It has 224×224 BGR tensor as an input and 2 outputs—negative or positive class (quality) of image respectively. This architecture uses a low initial learning rate (510-4) and only 3 epochs for training.

In a preferred embodiment, it is recommended to use pretrained weights from ImageNet classification or a similar task.

The Spoofing Mask Module plays almost the same role as attention-like layers in Deep Neural Networks (DNN), but it has some significant distinguishing features:

1. Spoofing Mask Module is a separate module which can be trained separately of the Liveness Module.

2. Spoofing Mask Module can be implemented as a combination of DNN and non-DNN approaches.

3. Spoofing Mask Module is trained specifically to detect parts of an image which potentially can contain spoofing artifacts.

FIGS. 2A-2D illustrate mask propagation for an image with a spoofed face using with various spoofing attacks. In particular, FIGS. 2A-2D show input image 221a-221d with a face that enters in the Spoofing Mask Module 20 and is converted to attention binary mask 222a-222d. The Spoofing Mask Module 20 provides capability to focus on the area of interest and ignore the rest of the image. Images containing a face and the following artifacts of spoofing attacks can be used to train the Spoofing Mask Module: it can be light spots, bounding frames of the printed paper (FIG. 2A) or displays (FIG. 2B) shown to the camera. It can also be a facial area (FIG. 2C) if the spoofing attack is the cut picture or it can be eyes area (FIG. 2D) if spoofing is a silicone mask with cut eyes, and so on. In other embodiments, where the liveness detection must be determined by a palm or fingers, or any other part of the body, images of a palm or a finger or any other part of the body containing artifacts of spoofing attacks can be used for training.

Thus, the Spoofing Mask Module is a set of various algorithms that detects suspicious regions in which the effect of spoofing may appear, i.e. a separate algorithm detects frames in the image, a separate algorithm detects faces, a separate algorithm detects eye cutouts. In a preferred embodiment, these algorithms are based on neural networks. Therefore, the Spoofing Mask Module can be a module consisting of several neural networks at once.

As shown in FIGS. 2-5, the Spoofing Mask Module is trained to select a part of the image, which is a potential spoofing region. It is important to note that this part of the image does not contain a potential spoofing region, but itself represents a potential spoofing region or, in other words, an artifact of spoofing attacks. For example, a face image contains several regions, for example, such as cheeks, eyes, lips, forehead, etc., while some of these regions are more significant. One of the significant regions of the face is, for example, a region containing the construction of eyes, because it has a complex structure. Regions of complex construction are regions that should be considered when detecting liveness. If, for example, it is necessary to perform liveness detection from an image containing a presumably silicone mask that mimics a face, then the region of the eyes (and not the region of the cheeks, for example) will be an artifact that is worth paying attention to, since this region is more likely to determine that not a true user is presented in the image containing the mask. Using the same principle, a neural network of the Spoofing Mask Module is trained to pay attention and not select the entire image or a face, but choose specific regions of the face, around the face or any part of the image not relating to the face. The regions or parts of the image selected in this way are taken as a greater weight in the next step, when the neural network detects liveness.

The Spoofing Mask Module is trained according to the following steps.

1. Collect spoofing attacks (screen replays, printed photos and cutouts, paper masks etc.).

2. Prepare a segmentation of collected images:
attacker devices can be fully or partially highlighted;
printed cutouts are usually highlighted through human body outline;
masks can be fully highlighted or just contain some highlighted regions;
any additional features could also be highlighted: OS task panel or window elements (for screen attacks), labels, hands near face etc.

Highlighting of said parts of the image can be carried out by an expert using elements of process automation.

3. Train a model to generate a spoofing mask map (using Image-to-Image method, for example).

In another embodiment, the Spoofing Mask Module may contain one neural network, which is trained to select at least one part of the captured image, which is a potential spoofing region and is subsequently used for this purpose.

These algorithms may not necessarily be based on neural networks; these may be other algorithms based on any other methods. For example, if an image containing a face contains a frame, then to detect the frame, for example, a machine learning ensemble meta-algorithm—boosting can be used. The Spoofing Mask Module can relate not only to deep learning models based on neural networks. In one embodiment, the Spoofing Mask Module can be implemented as a waterfall model of a classifier of regions based on Haar or LBP features. However, it is worth noting that the effectiveness of the Spoofing Mask Module, which is a deep learning models based on neural networks, will be higher.

In a preferred embodiment, the Spoofing Mask Module is trained separately, and the Liveness Module is trained after the Spoofing Mask Module is trained.

The Liveness Module is based on deep neural networks (DNN). The Liveness DNN is based on a family of EfficientNet models with simple image pre-processing. This DNN generalizes local (paper edges, mask distortions etc.) and global (Moire pattern, color shift etc.) features of a spoofing attack. Liveness DNN is an EfficientNet model with various augmentation techniques. It generalizes local and global features of a spoofing attack. Liveness DNN architecture is EfficientNet B0 with a single output. Efficient architecture uses a mobile inverted bottleneck convolution (MBConv).

Training dataset should be split into two parts: a real (live) image set and a spoof (attack) image set. Attack samples have to be transformed by the following operations: Random horizontal flip (p=0.5); Random JPEG compression, from 0 to 30% (JPEG quality coefficient from 100 to 70); Random contrast (random choice of Gamma, Linear or Log contrast); Add random value to all pixels; Randomly multiply by constant value; Randomly (p=0.1) apply motion blur; Randomly add noise (Gaussian, Laplassian or Poisson); Randomly (p=0.1) convert to grayscale image. For live class, we have to apply only random noise augmentation.

Adam optimization algorithm is used for all epochs. The binary cross entropy loss function was used for training. In a preferred embodiment, pre-trained weights from ImageNet classification or a similar domain are used.

Additionally, Liveness Module is trained using the set of images obtained after training the Spoofing Mask Module, i.e. images may contain a potential spoofing region.

In another embodiment, the Liveness Module can be trained with the Spoofing Mask Module, but in sequential measures, i.e. to iterate to learn the Spoofing Mask Module and then to iterate to learn the Liveness Module. For example, during the training of Liveness Module, the information from the trained Spoofing Mask Module can be used in the form of generated masks (a highlighted part of the image, which is a potential spoofing region, attention areas, ROI), by normalizing the input image by overlaying the generated masks on the original image. A weighted polypixel sum of images is used, where the highlighted part gets more weight (>0.5), and the rest of the image gets less weight (<0.5).

The interaction of the Spoofing Mask Module and the Liveness Module in the attack detection process is similar to their interaction during the training phase.

In a preferred embodiment of the proposed method for face spoofing attack detection during the spoofing attack detection process, the image with highlighted at least one part of the captured image, which is a potential spoofing region, is combined with the original captured image. Thus, a summarized image containing the original captured image and the image with highlighted at least one part, which is a potential spoofing region, is obtained. The Spoofing Mask Module selects the parts of the summarized image that are of highest priority by weighted summation of the above two images: the image with highlighted part and the original captured image (before highlighting). Thus, the highlighted at least one part, which is a potential spoofing region, gets more weight, and the rest of the summarized image gets less weight. Hereafter, the Liveness Module analyzes the weighted summarized image.

Figure 3:
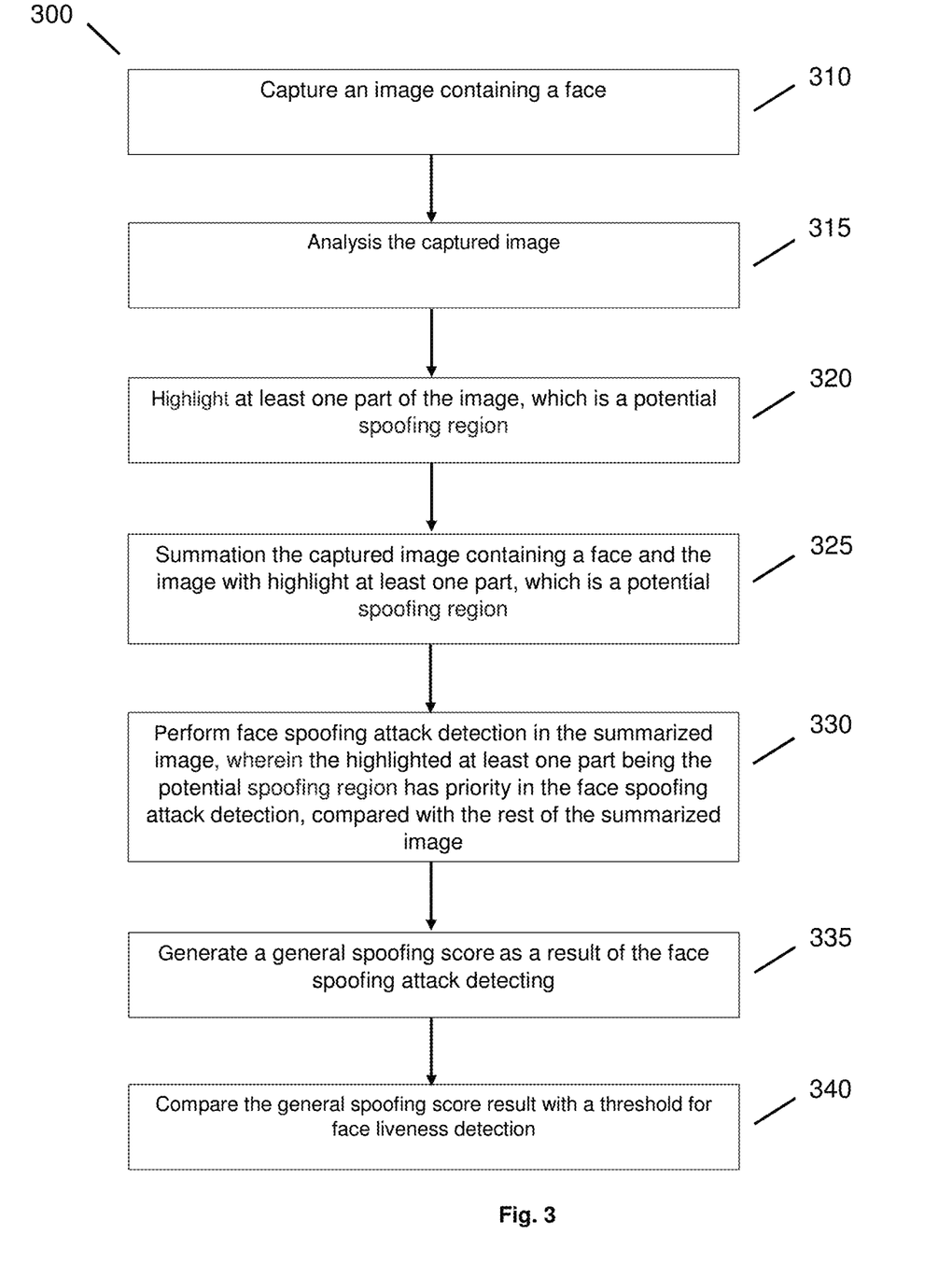
FIG. 3 shows a flow diagram of a face liveness detection method using weighted summation of the two images according to an example embodiment of the present invention.

The indicated steps of method 300 for face spoofing attack detection are shown on a flow diagram of an example computer-implemented illustrated in FIG. 3. The computer-implemented method for face spoofing attack detection comprises capturing 310 an image containing a face; analyzing 315 the captured image to determine quality of the captured image; highlighting 320 at least one part of the captured image, which is a potential spoofing region; summating 325 the captured image containing a face and the image with highlight at least one part, which is a potential spoofing region; performing 330 face spoofing attack detection in the summarized image, wherein the highlighted at least one part being the potential spoofing region has priority in the face spoofing attack detection, compared with the rest of the summarized image; generating 335 a general spoofing score as a result of the face spoofing attack detection based on the highlighted at least one part being the potential spoofing region and/or the rest of the summarized image; comparing 340 the general spoofing score result with a threshold for face liveness detection.

If the Spoofing Mask Module does not find parts of the image, which is a potential spoofing region, then Liveness Module works only with the original captured image.

The Liveness Module is not necessarily based on neural networks; it can be based on any other methods. For example, one of the methods may be a feature extraction based on histograms of local binary patterns (LBP) and a classifier (SVM, GBM, CatBoost). However, it is worth noting that the effectiveness of Liveness Module, which relates to deep learning models based on neural networks, will be higher.

The teachings herein may be incorporated into (e.g., implemented within or performed by) a variety of apparatuses (e.g., devices). For example, one or more aspects taught herein may be incorporated into a phone (e.g., a cellular phone), an authentication terminal (e.g., at an airport, bank, office, etc.), a personal data assistant ("PDA"), a tablet, a wearable device, an Internet of Things (IoT) device, a mobile computer, a laptop computer, a user I/O device, a computer, a wired computer, a fixed computer, a desktop computer, a server, a point-of-sale device, a set-top box, or any other type of a computing device. These devices may have different power and data requirements.

Those skilled in the art would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software, it depends upon the particular application and design constraints imposed on the overall system. Those skilled in the art may implement the described functionality in varying ways for each particular application, but such implementation decisions should not be interpreted as causing a departure from the scope of the present invention.

It will be apparent to those skilled in the art that described herein is a novel system method and apparatus for face spoofing attack detection. While the invention has been described with reference to specific preferred embodiments, it is not limited to these embodiments. The invention may be modified or varied in many ways and such modifications and variations, as would be obvious to those skilled in the art, are within the scope and spirit of the invention and are included within the scope of the following claims.

What is claimed is:

1. A method for face spoofing attack detection, the method comprising:
    capturing an image and determining presence of a face in the captured image;
    determining a context of the captured image comprising the face, wherein the context relates to a spoofing attack;
    highlighting a part of the captured image to generate an image with the highlighted part, wherein the highlighted part is a potential spoofing region determined based on the context of the captured image;
    combining the captured image with the image with the highlighted part to generate a summarized image, wherein determining the context of the captured image, highlighting the part and combining the captured image with the image with the highlighted part are performed by a spoofing mask module;
    performing face spoofing attack detection in the summarized image, wherein only the highlighted part has priority in the face spoofing attack detection, compared with the rest of the summarized image;
    generating a general spoofing score as a result of the face spoofing attack detection based on the highlighted part and the rest of the summarized image, wherein performing face spoofing attack detection and generating a general spoofing score are performed by a liveness module trained separately from the spoofing mask module, and the liveness module and spoofing mask module are independent feature extraction modules;
    comparing the general spoofing score result with a threshold for face liveness detection.

2. The method of claim 1, wherein the highlighted part of the captured image has an arbitrary shape.

3. The method of claim 1, wherein performing the face spoofing attack detection is made using a deep learning model.

4. The method of claim 3, wherein the deep learning model contains at least one neural network.

5. The method of claim 3, wherein performing the face spoofing attack detection comprises choosing a method for user liveness detection for the highlighted part of the summarized image using a deep learning model.

6. The method of claim 1, further comprising, when performing the face spoofing attack detection based on several highlighted parts of the summarized image:
    obtaining a spoofing score for each of the highlighted parts being the potential spoofing region and the rest of the summarized image; and
    summarizing the obtained spoofing scores to obtain the general spoofing score.

7. The method of claim 1, further comprising determining quality of the captured image before highlighting the part of the captured image.

8. A system for face spoofing attack detection, the system comprising:
    a camera configured to capture an image containing a face of a user,
    a spoofing mask module configured to determine a context of the captured image comprising the face, wherein the context relates to a spoofing attack, to highlight a part of the captured image to generate an image with the highlighted part, wherein the highlighted part is a potential spoofing region determined based on the context of the captured image, and to combine the captured image with the image with the highlighted part to generate a summarized image;
    a liveness module configured to detect a face spoofing attack in the summarized image, wherein only the highlighted part has priority in the face spoofing attack detection, compared with the rest of the summarized image, and to obtain a general spoofing score, wherein the liveness module is trained separately from the spoofing mask module, and the liveness module and spoofing mask module are independent feature extraction modules;
    a comparative module configured to compare the general spoofing score result with a threshold for face liveness detection.

9. The system of claim 8, wherein the spoofing mask module is based on at least one neural network.

10. The system of claim 8, wherein the spoofing mask module is configured to highlight the part of the captured image, which is a potential spoofing region, based on artifacts of spoofing attacks.

* * * * *